Feb. 13, 1940. P. E. McMURRY 2,190,412
PIPE LINE PRESSURE NEUTRALIZER
Filed Aug. 8, 1939
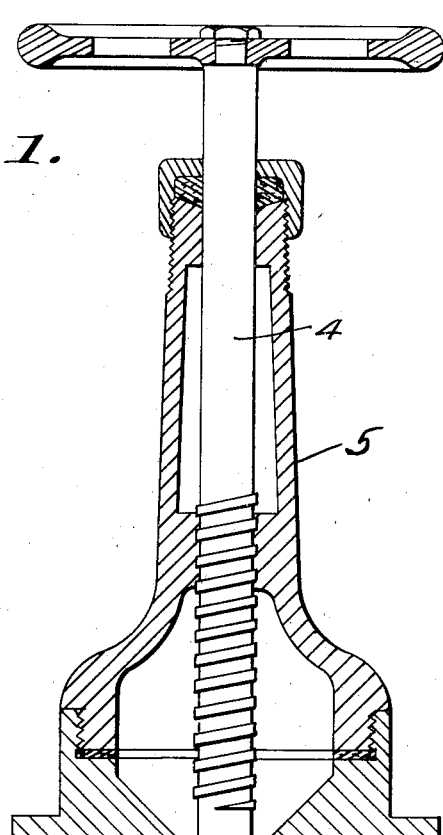
Fig. 1.
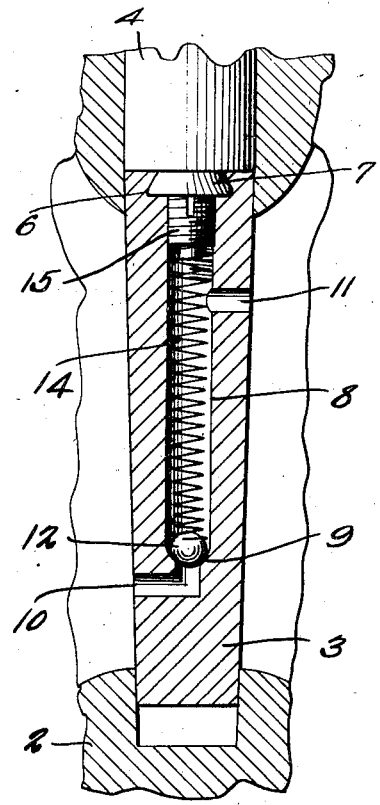
Fig. 2.
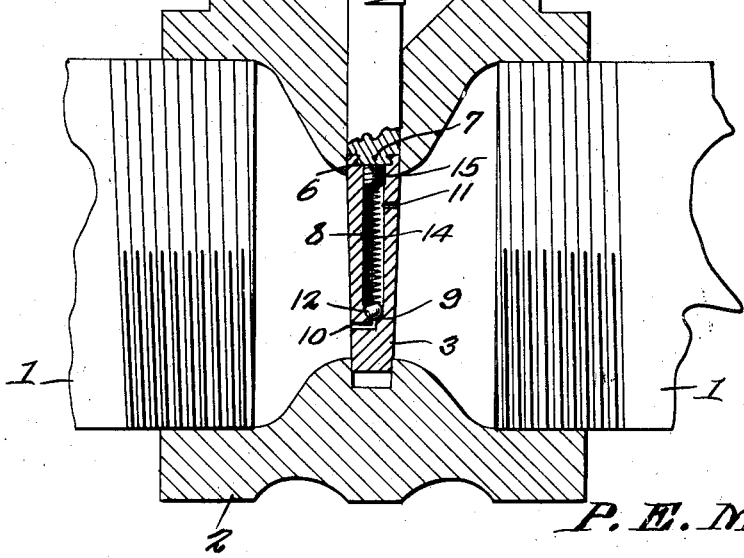
P. E. McMurry
INVENTOR.
BY
ATTORNEYS.

Patented Feb. 13, 1940

2,190,412

UNITED STATES PATENT OFFICE 2,190,412

PIPE LINE PRESSURE NEUTRALIZER

Paul E. McMurry, Concordia, Kans.

Application August 8, 1939, Serial No. 289,063

1 Claim. (Cl. 277—54)

This invention aims to provide a simple but effective means for relieving undue pressure on one side of a valve in a pipe line, the construction being such that all working parts are housed within the contour of the valve, there being no exposed and readily accessible parts promoting an unauthorized tampering with the structure. A further object of the invention is to supply a device of the class described which is so constructed that there will be no practical tendency for the collection of sediment and the like.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in vertical section, a device constructed in accordance with the invention;

Fig. 2 is a sectional view wherein parts depicted in Fig. 1 are shown on an enlarged scale.

The numeral 1 indicates a pipe line, in which is interposed a valve casing 2. A gate valve 3 is slidably mounted in the valve casing 2, for reciprocation at the will of an operator, the gate valve controlling the flow through the pipe line 1.

The gate valve 3 is moved to closed position by any suitable means. For instance, a stem 4 may be threaded into a neck 5 detachably connected, by threading or otherwise, with the casing 2, and forming a portion thereof.

In its upper edge, referring to Fig. 1, the gate valve 3 is supplied with a dovetailed groove 6, extended entirely across the valve from side to side. The groove 6 is adapted to receive a tapered, circular stud 7 on the lower end of the stem 4.

The gate valve 3 is supplied with a longitudinal bore 8, at the lower end of which there is a seat 9. A transverse inlet port 10, located on one side of the gate valve 3, leads to the seat 9 and the bore 8. The gate valve 3 has an outlet port 11 spaced from the port 10 and opening in a direction opposite to that in which the port 10 opens.

A check valve 12, preferably a ball, is mounted for movement in the bore 8 and is held closed on the seat 9 by a compression spring 14 disposed in the bore 8. Into the upper end of the bore 8 is threaded an adjuster 15 having a screw driver kerf, the adjuster bearing against the upper end of the spring 14 and constituting a means whereby the effort of the spring on the ball valve 12 may be regulated at the will of an operator.

In practical operation, if there is undue pressure on the left hand side of the gate valve 3 in Fig. 1, that pressure will find an exit to the right hand side of the valve, by way of the port 10, the bore 8 and the port 11, the ball valve 12 opening, against the action of the spring 14, to permit such an operation.

The means 4 for operating the gate valve 3 is assembled with the gate valve for displacement relatively to the gate valve, at the will of an operator, said means guarding the adjuster 15 and rendering it inaccessible until the aforesaid displacement is accomplished. Reduced to terms of structure, it is to be observed that the adjuster 15 lies beneath the stud 7 on the stem 4, and, therefore, tampering with the adjuster 15 will be rendered difficult. It is possible, however, to gain access to the adjuster 15 by taking the valve casing apart, and sliding the gate valve 3 off the stud 7 on the lower end of the stem 4.

The device forming the subject matter of this application is simple in construction but will be found thoroughly advantageous and practical for the ends in view.

Having thus described the invention, what is claimed is:

Pressure release mechanism comprising a valve casing, a gate valve slidable in the casing and having a longitudinal bore, there being a valve seat at one end of the bore, the gate valve having oppositely-opening ports, one of which communicates with the bore, by way of the valve seat, a check valve in the bore and cooperating with the seat, a closing spring for the check valve and located in the bore, one end of the spring cooperating with the check valve to hold it yieldably in closed positon, an adjuster movably mounted in the bore and cooperating with the opposite end of the spring, and means for operating the valve, said means being assembled with the gate valve for displacement relatively to the gate valve, at the will of an operator, said means guarding the adjuster and rendering it inaccessible until the aforesaid displacement is accomplished.

PAUL E. McMURRY.